(12) United States Patent
Lindberg et al.

(10) Patent No.: US 12,017,391 B2
(45) Date of Patent: Jun. 25, 2024

(54) ACTIVE AERO SYSTEM IN-MOLD ASSEMBLY HINGE MODULAR FRAME

(71) Applicant: Magna Exteriors Inc., Concord (CA)

(72) Inventors: Braendon Lindberg, Metamora, MI (US); Ross J. Parpart, Troy, MI (US); Anthony J. Povinelli, Romeo, MI (US)

(73) Assignee: Magna Exteriors Inc., Aurora (CA)

( * ) Notice: Subject to any disclaimer, the term of this patent is extended or adjusted under 35 U.S.C. 154(b) by 213 days.

(21) Appl. No.: 16/754,420

(22) PCT Filed: Oct. 10, 2018

(86) PCT No.: PCT/IB2018/057868
§ 371 (c)(1),
(2) Date: Apr. 8, 2020

(87) PCT Pub. No.: WO2019/073422
PCT Pub. Date: Apr. 18, 2019

(65) Prior Publication Data
US 2020/0391418 A1    Dec. 17, 2020

Related U.S. Application Data

(60) Provisional application No. 62/570,391, filed on Oct. 10, 2017.

(51) Int. Cl.
*B29C 45/00*     (2006.01)
*B29C 45/14*     (2006.01)
*B29C 45/16*     (2006.01)

(52) U.S. Cl.
CPC .... *B29C 45/0017* (2013.01); *B29C 45/14336* (2013.01); *B29C 2045/0065* (2013.01); *B29C 2045/1601* (2013.01)

(58) Field of Classification Search
CPC .... B29C 2045/0065; B29C 2045/1601; B29C 45/0017; B29C 2045/0022
See application file for complete search history.

(56) References Cited

U.S. PATENT DOCUMENTS

| 6,854,768 B2 | 2/2005 | Elder |
|---|---|---|
| 2005/0150087 A1 | 7/2005 | Lydan |

(Continued)

FOREIGN PATENT DOCUMENTS

| CN | 105538600 A | 5/2016 |
|---|---|---|
| GB | 1554635 | * 10/1979 |

(Continued)

OTHER PUBLICATIONS

Britannica Dictionary, "Bond Definition" https://www.britannica.com/dictionary/bond (Year: 2023).*

(Continued)

*Primary Examiner* — S. Behrooz Ghorishi
*Assistant Examiner* — Alexander A Wang
(74) *Attorney, Agent, or Firm* — Warn Partners, P.C.

(57) ABSTRACT

A manufacturing process for an active grille shutter arrangement including in-mold assembly of an active aero hinge modular frame that allows for the joining of multiple components that are to be assembled directly out of the molding process tooling. These components could be the vane end pivots, vane end stops, drive linkages, frame end stops, etc. Final assembly of the system is facilitated by geometrical considerations and molding material considerations in the in-mold assembly (IMA) design.

4 Claims, 4 Drawing Sheets

(56) References Cited

U.S. PATENT DOCUMENTS

2007/0264474 A1* 11/2007 Filipp ................ B29C 45/1639
264/328.8
2020/0094454 A1* 3/2020 Cain .................. B29C 45/0046

FOREIGN PATENT DOCUMENTS

| JP | H0622616 U | 3/1994 |
| JP | H07148778 A | 6/1995 |
| WO | 2012111708 A1 | 8/2012 |

OTHER PUBLICATIONS

International Search Report for PCT/IB2018/057868 dated Jan. 24, 2019, 2 pages.

* cited by examiner

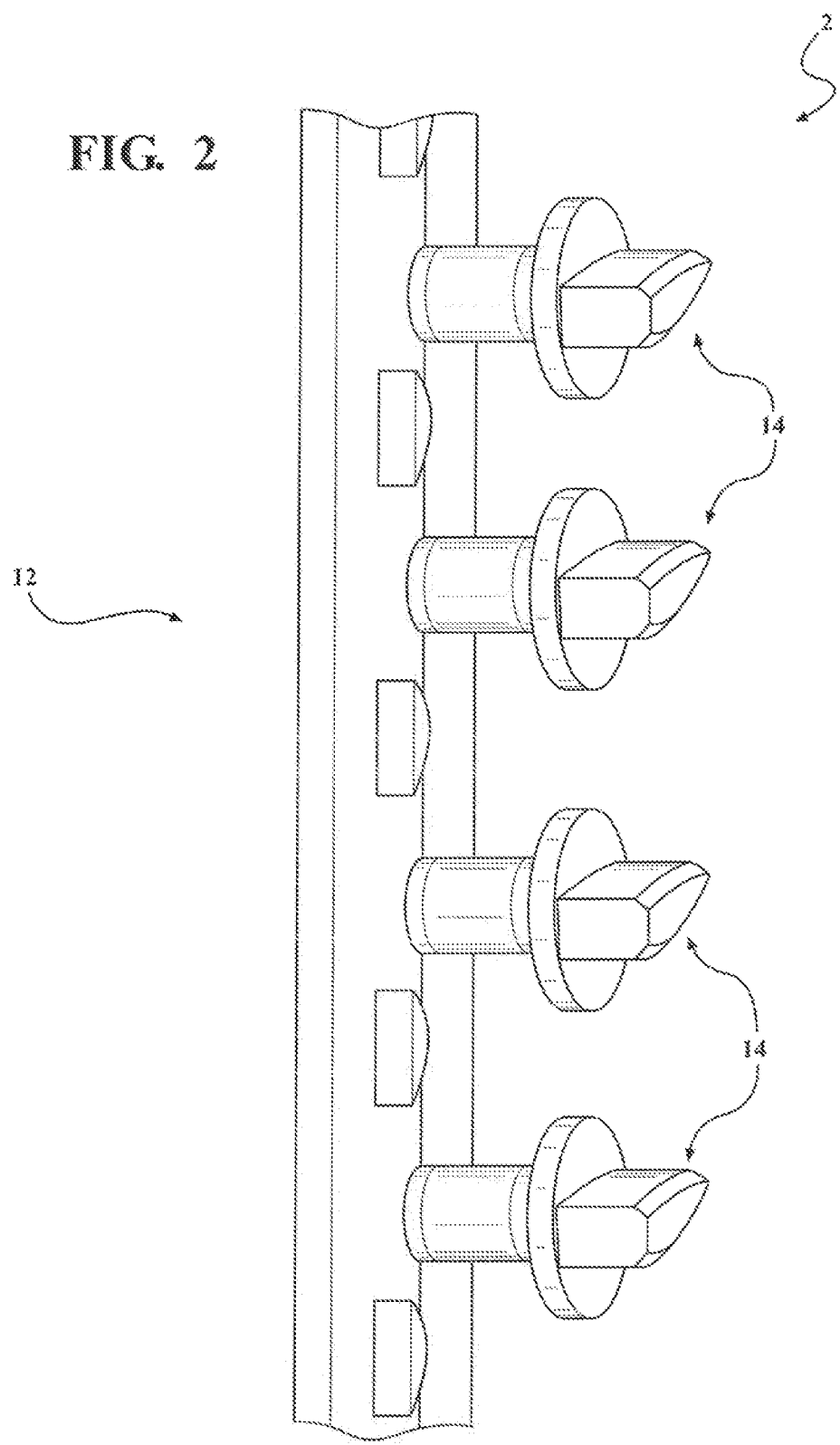

FIG. 6
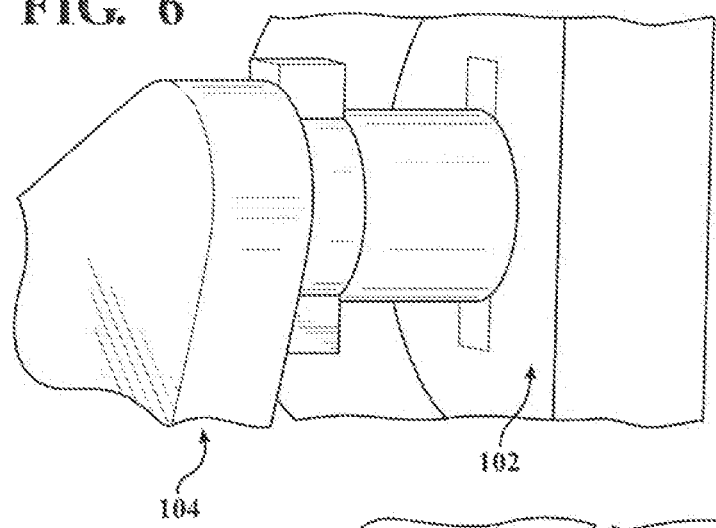
FIG. 7
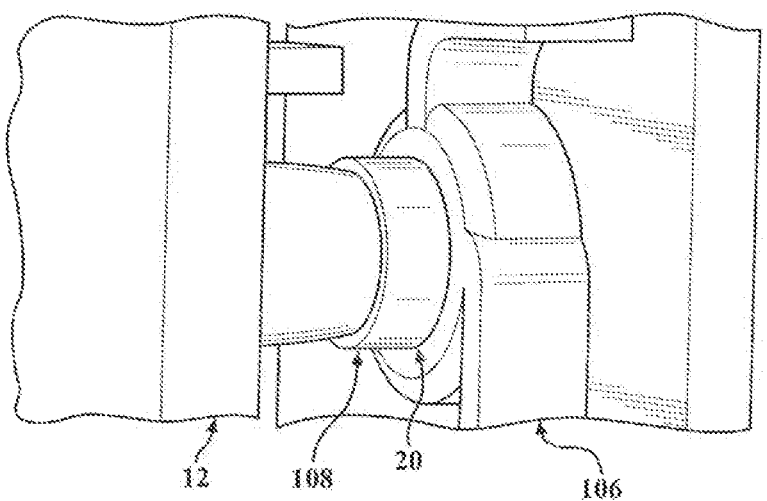
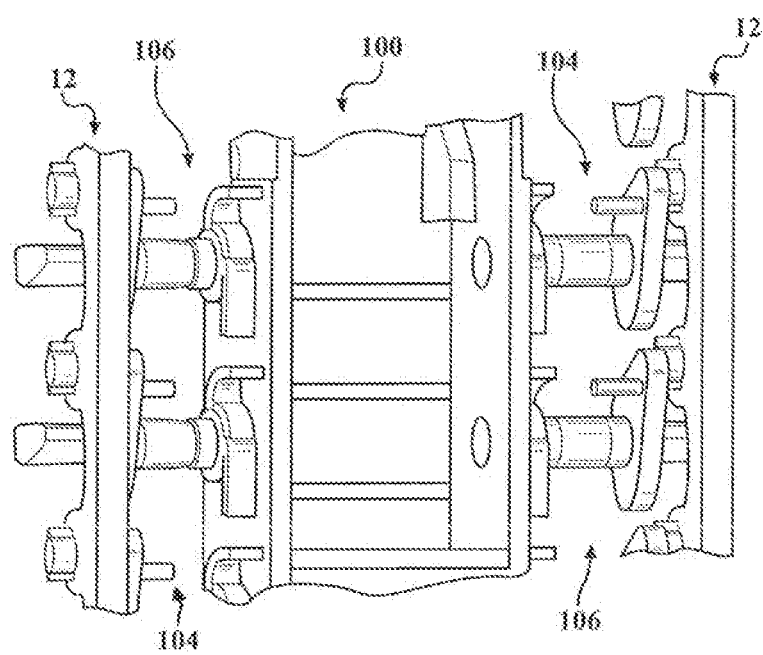
FIG. 8

ACTIVE AERO SYSTEM IN-MOLD ASSEMBLY HINGE MODULAR FRAME

CROSS-REFERENCE TO RELATED APPLICATIONS

This application is a National Stage of PCT International Patent Application No. PCT/IB2018/057868, filed Oct. 10, 2018, which claims the benefit of U.S. Provisional Patent Application No. 62/570,391, filed Oct. 10, 2017. The disclosures of the above applications are incorporated herein by reference.

FIELD OF THE INVENTION

The present invention relates to an in-mold process for making a two-piece connected and movable part.

BACKGROUND OF THE INVENTION

Attempts have been made to optimize the cooling of various automobile parts. Some of the various devices developed have been designed to control the air flow throughout the engine compartment of the automobile such that the desired amount of heat is transferred away from the engine, transmission, and other components which generate heat, in order to maintain an optimal operating temperature.

It is also desirable to bring the engine up to the normal operating temperature as soon as possible after engine start-up. When the engine is substantially the same temperature as the surrounding environment and is turned on, the engine is the least fuel efficient (especially during start-up and the temperature of the surrounding environment is cold). The reduced fuel efficiency is why it is considered desirable to bring the engine up to the optimal operating temperature very quickly. Under these conditions, it is not desirable to remove heat away from the engine and the various components surrounding the engine, and therefore devices designed to control air flow around the engine are more beneficially used if they do not remove heat away from the engine at start-up.

With the advent of glass filled and other structural plastics assemblies which are moveable on part with respect to another are being made for pivotal members, hinges and the like. Typically the parts are injection molded separately and then assembled for providing the final moveable structure. Some such components are a kinematic link and a vane part of an active grille shutter.

Molding of vanes in assembled position has not been possible as other components need to be installed mid-process. Further, vane assemblies of active aero grille shutters that have been developed are difficult to automate due to geometrical constraints that require high operator interface. Pivot pieces are typically molded separately and then assembled.

Various injection molding tools which produce separate parts are typically required. These separate parts have build variations and are labor intensive to assemble. The parts are post-mold assembled which requires additional equipment, floor space and labor and can include more assembled variation.

Therefore there remains a need in the art for a design of an effective and efficient in-mold assembly of an active aero modular frame that allows for joining multiple components directly out of the molding process tooling reducing assembly time, post-mold assembly and equipment, and error proofing.

SUMMARY OF THE INVENTION

The present invention allows for the use of cost effective manufacturing methods that allows for various components to be assembled in a component directly from the mold tooling.

The present invention relates to a process for in-mold assembly of an active aero hinge modular frame that allows for the joining of multiple components that are to be assembled directly out of the molding process tooling. These components include the vane end pivots, vane end stops, drive linkages, frame end stops and the like. Final assembly of the system is facilitated by geometrical considerations in the in-mold assembly (IMA) design, preferably, the actuator to drive vane interface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a perspective view of the plurality of pivotal portions to be joined to the frame made in the process of the present invention;

FIG. 6 is a perspective view of a linkage connected to a frame and vane end cap, in accordance with aspects of the present invention;

FIG. 7 is a perspective view of a vane pivot coupled to a frame, in accordance with aspects of the present invention; and FIG. 8 is a perspective view of a component parts assembled to a 4-bar linkage and component parts assembled to a frame made in accordance with the teachings of the present invention.

DETAILED DESCRIPTION OF THE PREFERRED EMBODIMENTS

Figure 1:
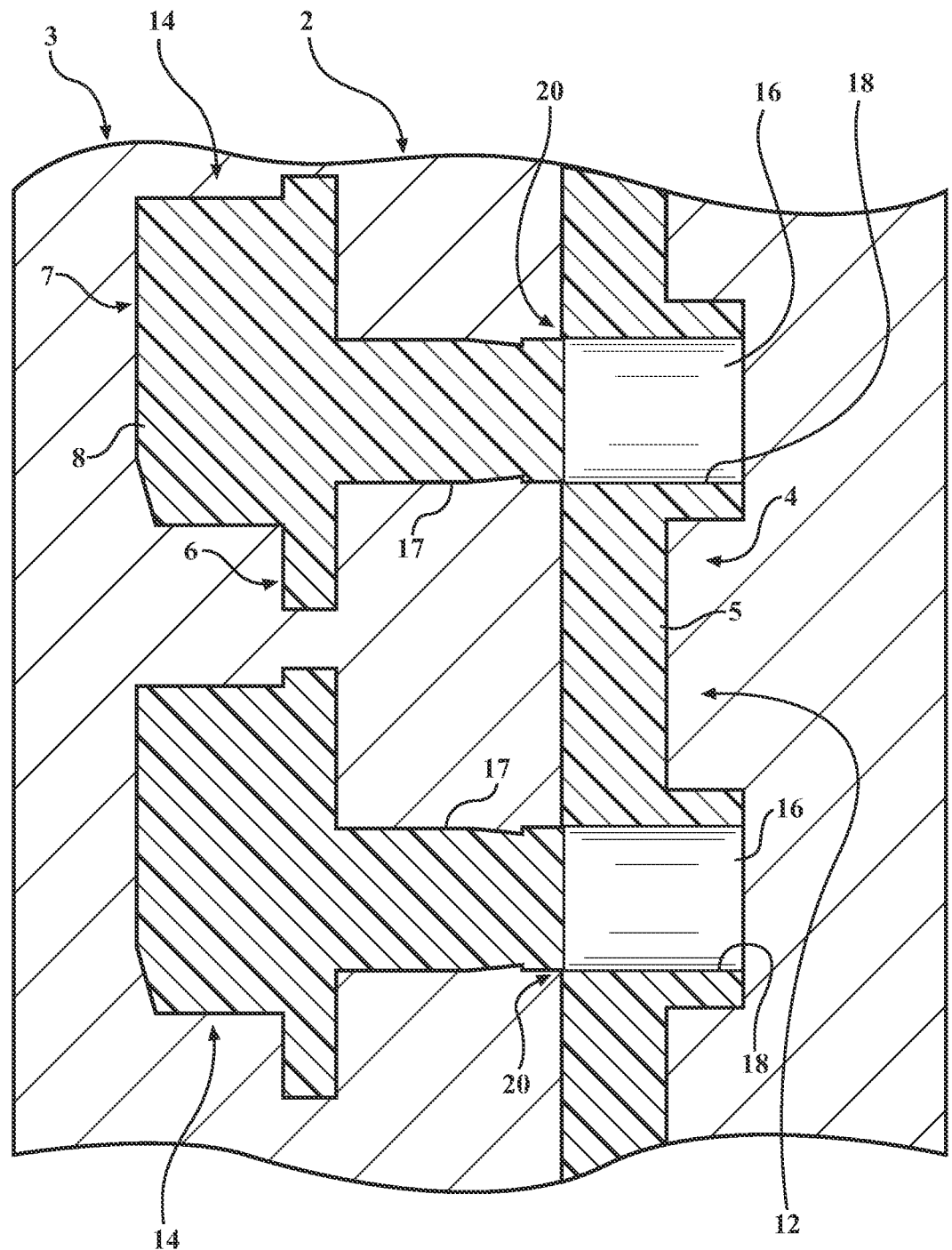
FIG. 1 is a cross sectional schematic illustration of a plurality of pivotal portions to be joined to a frame in the process according to the present invention.

The following description of the preferred embodiment(s) is merely exemplary in nature and is in no way intended to limit the invention, its application, or uses.

Referring to the figures generally, there is provided an in-mold assembly of an active aero hinge modular frame that allows for the joining of multiple components that are to be assembled directly out of the molding process tooling. These components include, e.g., vane end pivots, vane end stops, drive linkages, and/or frame end stops and the like. Final assembly of the system is facilitated by geometrical considerations in the in-mold assembly (IMA) design, in particular the actuator to drive vane interface.

Geometrical considerations allow for components (e.g., such as vane end pivots, vane end stops, drive linkages, frame end stops, etc) to be attached and assembled in a singular component directly from the mold. These components provide various functions in the completed system including rotational joints and torque transmission.

There is provided at least one breakaway geometrical feature which allows for a single component to replace a typical design with multiple (e.g., about 6-20 or more) components.

Geometrical considerations allow for the assembly of actuator drive vane to be facilitated with a single component.

The present invention also allows for a rotational joint to be established from a single component through a single degree of motion assembly.

Referring to FIGS. 1-8 generally, in accordance with the present invention, there is provided an active aero hinge modular frame and a process for forming of an active aero hinge modular frame indicated generally at 2. The present invention generally provides molding a rotational joint and frame together. The process generally includes at least in-mold assembly steps, break away mid-assembly steps, and assembling steps.

Tooling is provided operable for multiple shots of material. Preferably, a two shot rotary molding tool, indicated generally at 3, having at least a first molding cavity, indicated generally at 4, for forming at least one predetermined first body portion, shown generally at 12, with a first injection of a predetermined first material 5, and, at least a second cavity, indicated generally at 6 for forming at least one predetermined cooperating second body portion, shown generally at 14, with a second injection of a predetermined second material 8. The first and second materials 5,8 are dissimilar materials. In general, the first and second materials 5,8 are chosen depending on the application. Typically, the first and second materials 5,8 are chosen to create a bond sufficient for joining the body portions for placing the sub-assembly from the mold assembly 3 into a nesting assembly 9 and operable to then break the bond when the first and second body portions 12,14 are pressed operably together in the nesting assembly 9 and press the parts further together forming an assembly that allows predetermined body portions to pivot after assembled. Most preferably, geometrical considerations allow for components (e.g., such as vane end pivots, vane end stops, drive linkages, frame end stops, etc.) to be attached and assembled in a singular component directly from the mold. These components provide various functions in the completed system including rotational joints and torque transmission.

The first material 5 is an injection moldable material with predetermined properties, e.g., part mechanical properties, melt flow rate, coefficients/expansion, melting point, etc, depending on the application. The second material 8 is an injection moldable material with predetermined properties, e.g., part mechanical properties, melt flow rate, coefficients/expansion, melting point, etc, depending on the application. The first and second materials 5,8 are suitably compatible but different from each other so that a strong bond will not form which would hinder desired rotation of the second body portion relative to the first body portion. The bond between the first and second materials 5,8 is suitably weak to allow for a break away when desired after assembly. The materials 5,8 are also selected that are compatible with predetermined break away geometry of the first and second body portions 12,14 suitable to allow the second body portion 14 to rotate relative to the first body portion 12 after assembly. Thus, the combination of material selection and edge geometry, indicated generally at 20, provides break away at the edge of the parts post-assembly and to allow rotation of the second body portions 14 in the final assembly. It is understood that, alternatively, the first and second materials 5,8 are the not different materials depending on the application without departure from the scope of the present invention. The bond break is facilitated by geometrical considerations in the in-mold assembly design.

Referring more particularly to FIG. 1, the first body portion 12 is preferably a frame, most preferably a hinge frame. The plurality of second body portions 14 are each a cooperating component, which is depicted as a vane pivot in FIG. 1. The first body portion 12 is illustrated with a bearing surface 16 defining an opening 18 through the first body portion 12. Alternatively, the opening 18 extends part way through the first body portion 12. It is understood that the at least one second body portion 14 is/are any predetermined part depending on the application suitable for rotation relative to the at least one first body portion 12, e.g., such as vane end pivots, vane end stops, drive linkages, and/or frame end stops, etc.

In-mold assembling includes forming the at least one second body portion 14, preferably, a plurality of second body portions 14, adjacent to the first body portion 12. In a first molding step, the first material 5 is injected into the molding cavity 4 for forming the first body portion 12 (e.g., frame). The second material 8 is injected into the second molding cavity 7, most preferably while the first material is still being injected and/or is still molten, for forming the plurality of second body portions 14 (e.g., vane pivots) directly adjacent to the first body portion 12. Accordingly, the first material 5 is at the edge of, and in contact with, the second material 8. A bond is formed at this edge, indicated generally at 20. Typically, the bond is relatively weak. Substantially co-injection of the first and second materials 5,8 are contemplated without departure from the scope of the present invention.

Thus, FIG. 1 depicts an as tooled position and a sub-assembly position with an edge break contact 20 between body portions 12,14 that will allow for the break away mid-assembly portion of the process of the present invention.

FIGS. 1-2 illustrate the plurality of second body portions 14 that are vane pivots joined during molding to the first body portion, which is frame 12, with breakaway geometry 20. Once molded and cooled a predetermined amount, the assembly is operably transported to a nesting assembly 9. It is understood that any predetermined edge break geometry suitable for allowing assembly and rotation depending on the application is contemplated without departure from the scope of the present invention.

Figure 5:
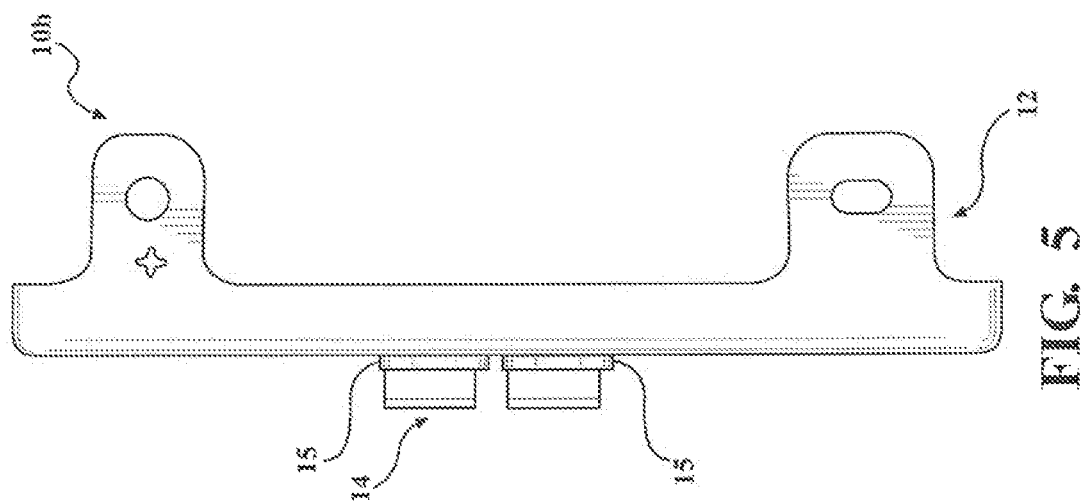
FIG. 5 is a side elevation of the pivotal portions assembled into the frame.
Figure 4:
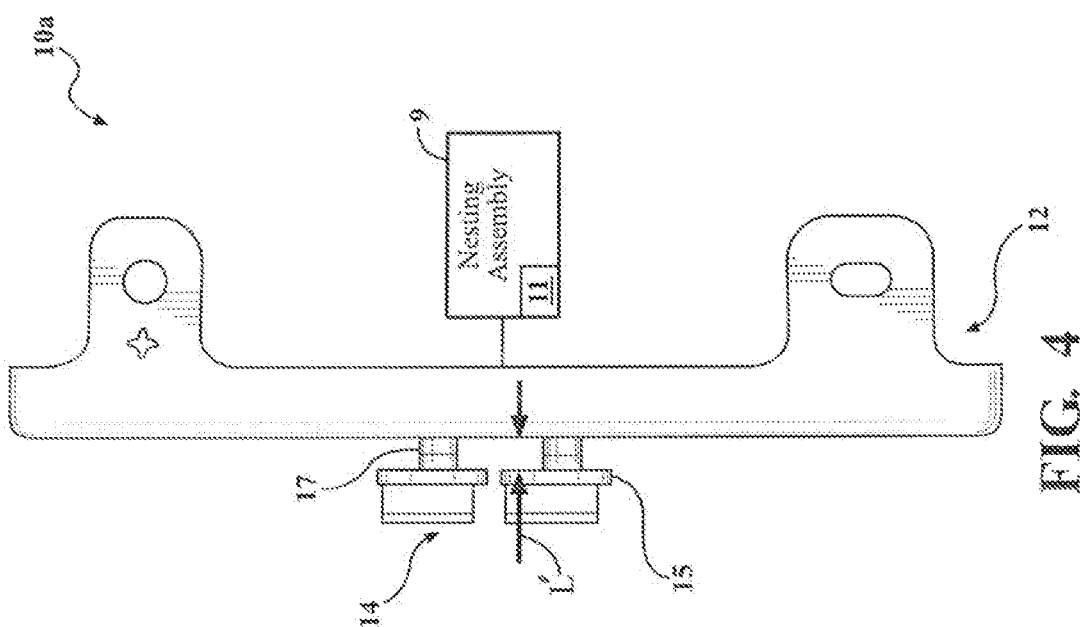
FIG. 4 is a side elevation of the pivotal portions edge contact break away with the frame made as pressing of the pivotal portions and frame together in a nesting fixture.
Figure 3:
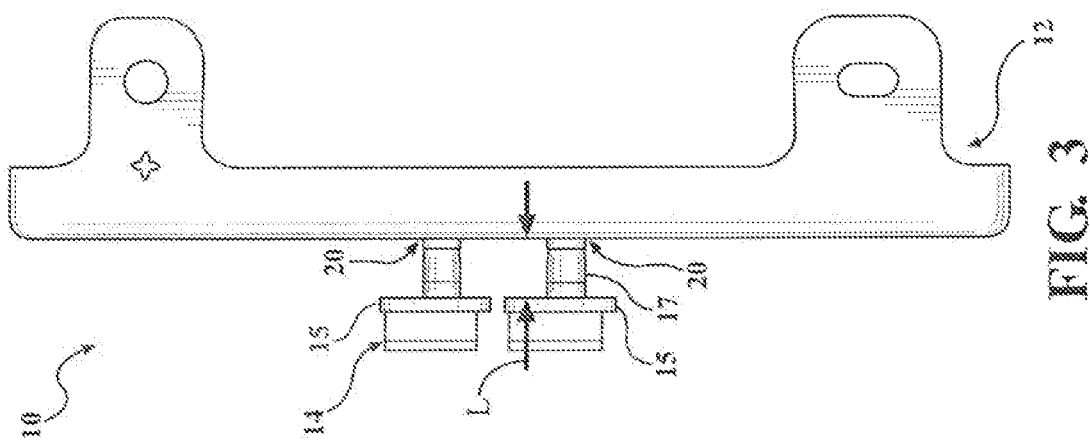
FIG. 3 is a side elevation of the pivotal portions directly adjacent to a surface of the frame out of a molding tool assembly, in accordance with the present invention.

Referring now to FIGS. 3-5 generally, there is depicted an as tooled assembly indicated generally at 10 (FIG. 3) out of the tooling assembly 3 including the edge break geometry portion 20. Each second portion 14, e.g., vane pivot base 15, is a predetermined distance 1' from the first portion 12. The as tooled assembly 10 is operably placed in a fixture of the nesting assembly 9 to form a mid-assembly, indicated generally at 10a (FIG. 4). The nesting assembly 9 is any fixture/nesting assembly operable for pressing the first and second portions 12,14 together for edge contact break away. The as-assembled assembly, illustrated generally at 10b (FIG. 5) illustrates the second body portions 14 partially pushed into the first body portion 12. In particular, a rotational member 17 of the second body portion 14 is pressed into the bearing 16 of the first body portion 12.

Referring to FIG. 4, there is depicted the mid-assembly portion of the process, including an edge contact break away that takes place in the nesting assembly 9 when the first and second body portions 12,14 are operably pressed together to allow break away and assemble the first and second body portions 12,14 together. A rotational member 17 of the second body portion 14 is pressed into the bearing 16 of the first body portion 12, indicated generally at L'. By way of non-limiting example, the nesting assembly 9 includes an automatic hydraulic cylinder 11 that causes the first and second body portions 12,14 to be pressed together at a predetermined force in the nest to assemble the first and second body portions together. It is understood that the nesting assembly 9 can be any suitable assembly for edge contact break away and forming the mid-assembly in the nest.

The first and second body portions 12,14 continue to be pressed together until assembled, as indicated in FIG. 5, e.g., there is no gap, or predetermined minimized gap, between the base 15 of the second portion 14 and the first portion 12.

Referring to FIGS. 6-8, in accordance with the present invention, there is further provided additional in-mold assembly of at least one additional assembly (e.g., in-mold assembly of a 4-bar linkage assembly) for an active grille shutter, shown generally at 100. Additional, or alternative, in-mold includes, but is not limited to, hinges, hinge pins, outer, pivotal members, linkages, etc.

FIG. 6 generally depicts the in-mold assembly design including at least one first body portion, shown generally at 102, (e.g., a linkage), and at least one second body portion, shown generally at 104, (e.g., a vane end cap). The first body portion 102 is already installed and trapped by the design to the second body portion 104 (as set forth previously). In a first molding step, the first material 5 is injected into an operably molding cavity for forming the first body portion 102 (e.g., linkage). The second material 8 is injected into the second molding cavity, most preferably while the first material is still being injected and/or is still molten, operable or forming the plurality of second body portions 104 (e.g., vane end caps) drive side directly adjacent to the first body portion 102. Accordingly, the first material 5 is at the edge of, and in contact with, the second material 8, forming a bond at this edge sufficient for joining the parts for transporting the sub-assembly from the mold assembly 3 to a nesting assembly 9 and operable to then break the bond when the first and second body portions 102,104 are pressed operably together in the nesting assembly 9 and press the parts further together forming an assembly that allows predetermined body portions to pivot after assembled. The first body portion 102 is preferably the linkage and the second body portion 104 is preferably the vane end cap of a drive mechanism. The in-mold assembly design has the linkage 102 already installed and trapped by design to the plurality of vane end cap 104.

FIG. 7 generally the in-mold assembly design including at least one first portion, shown generally at 106, (e.g., a frame), and at least one second body portion, shown generally at 108, (e.g., a vane pivot). The second body portion 108 is joined during molding to the first body portion 106 with breakaway geometry. The second body portion 108 is preferably the vane pivot and the first body portion 106 is preferably the frame. The vane pivot 108 is joined during molding to the frame 104 with breakaway geometry, as set forth previously. The second material 8 is injected into the second molding cavity, most preferably while the first material is still being injected and/or is still molten, operable or forming the plurality of second body portions 108 (e.g., vane pivot) drive side directly adjacent to the first body portion 106. Accordingly, the first material 5 is at the edge of, and in contact with, the second material 8, forming a bond at this edge sufficient for joining the parts for transporting the sub-assembly from the mold assembly 3 to a nesting assembly 9 and operable to then break the bond when the first and second body portions 106,108 are pressed operably together in the nesting assembly 9 and press the parts further together forming an assembly that allows predetermined body portions to pivot after assembled.

While an active grille shutter is illustrated, it is understood that the present invention is not limited to an active grille shutter and is adoptable for any active aero system depending on the particular application without departure from the scope of the present invention.

Referring to FIGS. 1-8 generally, at least the contact surface(s) of the second body portion 14 is/are of a dissimilar material than the first body portion 12 so that the body portions 12,14 will not stick during break away in the nest assembly 9 and once parts 12,14 are pressed together will allow the second body portion(s) 14 to rotate relative to the first body portion 12. Material selections and geometric selections are factors that allow break away at the edge of the parts 20 to allow pressing together and rotation to happen in the final assembly 10b,100.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of in-mold assembly of an active aero system, comprising:

providing a rotary tool operable for forming predetermined geometrical features at a plurality of rotational joints;

providing at least one first shot of molten material forming at least one first body portion;

providing at least one second shot of molten material that is a different material than the first shot, forming a plurality of second body portions, said first and second shot of molten materials coming into contact and forming a boundary having predetermined edge break geometry at the boundary of each of said at least one first body portion and plurality of second body portions; and pressing said at least one first body portion and sad plurality of second body portions together forming an assembly, wherein sad first body portions and said plurality of second body portions are solidified prior to when said pressing step occurs, and wherein the pressing step comprises providing a nesting assembly including a fixture operable to press the first and second body portions together forming the assembly.

2. The method of claim 1, wherein each of said predetermined edge break geometry boundaries is operable to allow each edge break boundary where said at least one first and said plurality of second body portions meet to bond to permit each of said plurality of second body portions to press inside the at least one first body portion and allow the assembled plurality of second body portions to rotate relative to the at least one first body portion.

3. The method of claim 1, further comprising providing a plurality of bearing surfaces each defining an opening in said at least one first body portion and pressing a respective rotational member of each of said plurality of second body portions into said opening, respectively, providing a rotational joint with each of said plurality of rotational members and said bearing surfaces, respectively.

4. The method of claim 1, wherein said at least one first body portion is a frame and each of said plurality of second body portions is a vane pivot, and further comprising joining each vane pivot during injection molding to said frame with break-away geometry.

* * * * *